United States Patent
Denes

[15] 3,638,147
[45] *Jan. 25, 1972

[54] HIGH-FREQUENCY LOW-PASS FILTER WITH EMBEDDED ELECTRODE STRUCTURE

[72] Inventor: Peter A. Denes, 9101 Crestwood Ave. N.E., Albuquerque, N. Mex. 87112

[*] Notice: The portion of the term of this patent subsequent to July 15, 1986, has been disclaimed.

[22] Filed: June 6, 1969

[21] Appl. No.: 831,142

Related U.S. Application Data

[63] Continuation-in-part of Ser. No. 393,946, Sept. 2, 1971, Pat. No. 3,456,215, and a continuation-in-part of 730,352, May 20, 1968.

[52] U.S. Cl..................333/79, 317/242, 317/259, 333/70S
[51] Int. Cl..........................H03h 7/14, H03h 7/06
[58] Field of Search ..............333/70, 79, 31; 317/242, 101, 317/258, 256; 29/625, 25.42

[56] References Cited

UNITED STATES PATENTS

| | | | |
|---|---|---|---|
| 3,274,468 | 9/1966 | Rodriguez | 317/258 |
| 3,235,939 | 2/1966 | Rodriguez et al. | 29/25.42 |
| 3,289,118 | 11/1966 | Garstang | 333/79 |
| 3,320,557 | 5/1967 | Garstang | 333/79 |
| 3,456,215 | 7/1969 | Denes | 333/79 |
| 3,243,738 | 3/1966 | Schlicke et al. | 333/79 |
| 3,329,911 | 7/1967 | Schlicke et al. | 333/79 |
| 2,440,652 | 4/1948 | Beverly | 333/31 |

Primary Examiner—Herman Karl Saalbach
Assistant Examiner—C. Baraff
Attorney—Spensley and Horn

[57] ABSTRACT

A three terminal pi filter having embedded electrodes, or a system of embedded electrodes, whereby the embedded structure of the electrodes results in a pi filter having higher insertion losses, better attenuation of unwanted signal power, greater mechanical strength and smaller dimensions than previously known filters.

34 Claims, 8 Drawing Figures

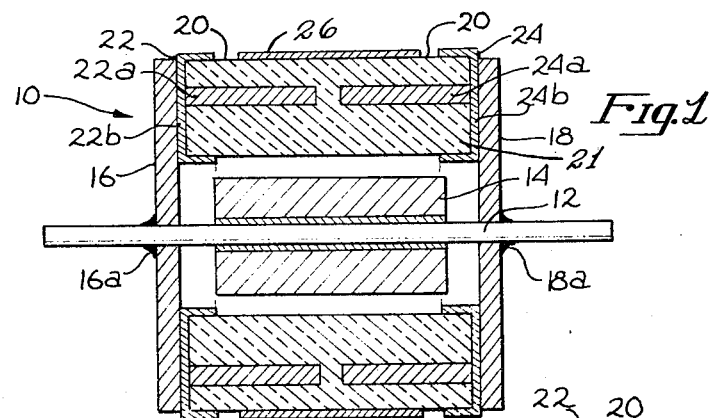
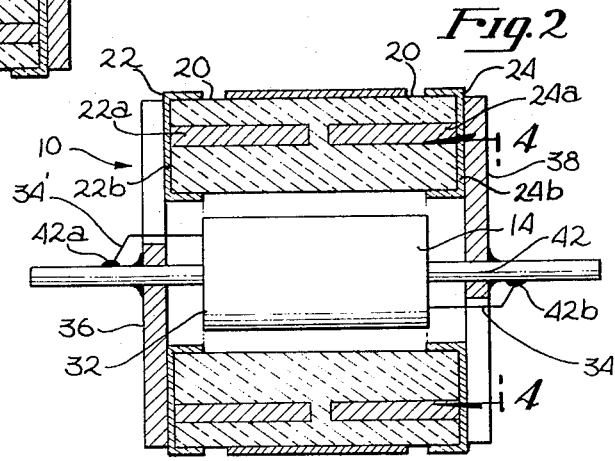
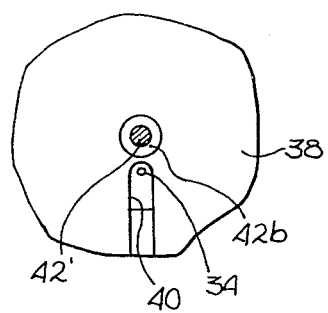
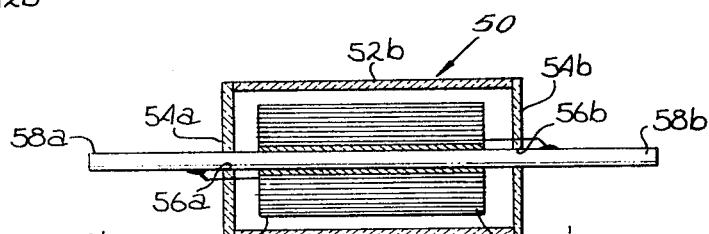
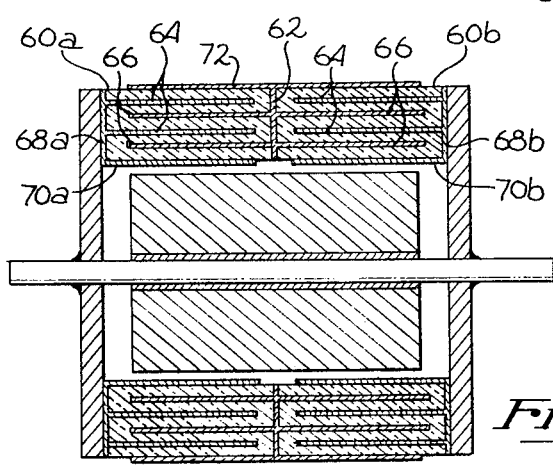
PETER A. DENES
INVENTOR.

HIGH-FREQUENCY LOW-PASS FILTER WITH EMBEDDED ELECTRODE STRUCTURE

This application is a continuation-in-part of my applications Ser. No. 393,946, filed Sept. 2, 1964 and now U.S. Pat. No. 3,456,215 and Ser. No. 730,352, filed May 20, 1968.

BACKGROUND OF THE INVENTION

1. Field of the Invention

The invention basically relates to the structure of three terminal pi filters used for high-frequency low-pass applications.

2. Description of the Prior Art

The prior art teaches constructing pi filter units by placing the electrodes of the capacitor portion on the inner and outer surfaces of a ceramic tube or sleeve. This construction is shown in FIG. 1 of U.S. Pat. No. 3,289,118, for example. One of the disadvantages to this construction is that in order to obtain a given capacitance the ceramic tube often is too thin to yield a device having the necessary mechanical strength and ruggedness for certain environmental uses. Further, it has been found that attenuation properties of these prior art filters or units are not optimized for the dimensional size of the filter.

The prior art has utilized ceramic capacitors having cofired embedded electrodes. These capacitors have two terminals and two alternating embedded electrode systems of which one system of equipotential electrodes are connected on the flat end sides of a tubular or pallallelpipedon-shaped capacitor.

However, pi filters are three terminal devices and have two capacitor sections. One electrode (or system of a plurality of parallel connected electrodes) of both capacitor sections are on the same potential and are connected to one terminal while a second set of electrodes (or a second system of a plurality of parallel connected electrodes) of the two capacitor sections are insulated from each other and connected to two further separate terminals.

The prior art capacitor units have utilized constructions commonly known as "ceramic rolled capacitors" or "multidisc capacitors." The "ceramic rolled capacitors" have a self-inductance which causes appreciable drop in attenuation when used in a filter above a certain frequency range. This is true even if the equipotential electrodes are connected (shorted) on the two end walls. The frequency at which the attenuation drop becomes appreciable is dependent on the structure of the ceramic rolled capacitor but may be as low as approximately 30 MHz. The "multidisc capacitors" are very expensive and inefficient when used in miniature filters where the lengths are much larger than their diameters. Typically the insulating rings of the electrodes occupy at least 50 percent of the total surface of the discs, and the usual lengths require many discs (e.g., several hundred). This makes the "multidisc" structure impractical and expensive.

As will become apparent none of the structures found in the prior art devices are capable of yielding a pi filter with the attenuation characteristics of the present invention as well as providing a compact and rugged configuration.

SUMMARY OF THE INVENTION

The present invention is directed to a three terminal pi filter having a unique structure of embedded electrodes which results in higher attenuation and excellent mechanical properties. The present invention also involves a pi filter having a new configuration for three terminal double-capacitors in which the embedded electrode layers of the capacitor sections form cylindrical surfaces parallel to and concentric with the axis of the ceramic double-capacitor. The equipotential electrode cylinders are connected with conductive discoidal patterns the axis of which approximately coincides with the axis of the capacitor. The embedded electrodes of the double-capacitors may be formed by a simple and economical silk screening process.

Unlike the prior art structures previously discussed the invented structure has very small self-inductance and only a few embedded electrode layers (typically one to 10). The invented structure is more rugged than the prior art devices since in certain embodiments of the invention the thickness of the ceramic tube may be selected primarily for strength and high capacitance can still be obtained. The ease and economy of making the invented structure coupled with the higher attenuation characteristics and better mechanical and dimensional features will be apparent to those skilled in the art from the drawings and description of the preferred embodiments which follow.

BRIEF DESCRIPTION OF THE DRAWINGS

FIG. 1 is a longitudinal sectional view of one embodiment of the invented filter structure having a single section pi filter unit with a single turn, the throughgoing terminal;

FIG. 2 is a longitudinal sectional view of another embodiment of the invented filter structure utilizing more than one turn of a throughgoing wire;

FIG. 3 is a longitudinal sectional view of a core with windings parallel to the axis of the core which may be used in the invented filter structure;

FIG. 4 is an end view of the filter shown in FIG. 2 taken along the line 4—4;

FIG. 5 shows another embodiment of the invented filter structure having two separate multilayer ceramic capacitor sections joined by a noble metal joint;

DESCRIPTION OF THE PREFERRED EMBODIMENTS

Figure 6:
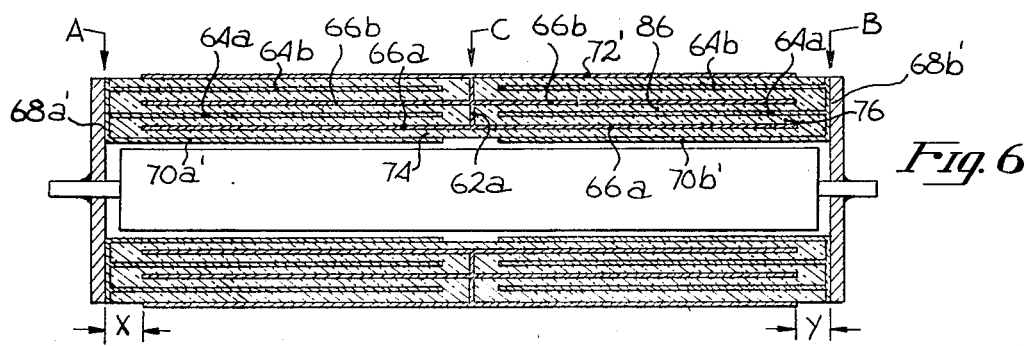
FIG. 6 shows another embodiment of the invented filter having two multilayer capacitor sections formed from on a single ceramic tube.

As previously described above, the prior art high-frequency low-pass pi filters (e.g., C-L-C pi filters) are made in a ceramic tube having two inside and one common outside electrode. Such prior art structure is shown, for example, in FIG. 1 of U.S. Pat. No. 3,289,118.

FIG. 1 shows a pi filter unit 10 having central conductor 12, a ferrite or ferromagnetic inductor core 14, and end discs 16 and 18. The discs 16 and 18 have central openings 16a and 18a through which the central conductor 12 passes. The structure shown in FIG. 1 is identical to that shown in FIG. 6 of my copending application Ser. No. 393,946, filed Sept. 2, 1964.

The inductance portion 14 of the filter unit 10 is formed by using a ferromagnetic or ferrimagnetic (ferrites) core or bead. As more fully described in my previously copending application, ferromagnetic cores are preferable to ferrites because they provide better attenuation characteristics, are practically independent of the direct current or low frequency current flowing through the central conductor and they exhibit negligible attenuation losses at internal resonance frequency ranges. However, the invented embedded electrode structure to be described will improve the electrical and mechanical properties of ferrite core filters as well as those filters having ferromagnetic cores. For purposes of description and by way of example only, it will be assumed that the core 14 is a ferromagnetic material of the type generally disclosed in my previously mentioned copending application.

A suitable tube of insulating material 20 for the capacitors will be described. The preferred insulating material is a ceramic and thus the description will relate to ceramic insulators but other insulators can be used. The ceramic tube 20 is substantially thicker than the tubes used in other filter units having a solid ceramic tube such as shown in FIG. 1 of my previously mentioned copending application or in FIG. 1 of U.S. Pat. No. 3,289,118. The capacitor forming electrodes 22 and 24 have inner cylindrical capacitor plate-forming portions 22a and 24a embedded within the body of the ceramic tube 20. The outer electrode 26 forms a common ground electrode for the pair of capacitors formed by the cylindrical embedded electrodes 22a and 24a and separated by a portion of the dielectric ceramic tube 20 between the embedded electrodes and the outer electrode. The spacing between the inner embedded capacitor plate-forming electrodes 22a and 24a and the outer electrode 26 is determined by the desired capacitance of the filter unit. The overall thickness of the ceramic tube 20 is determined primarily by strength considerations. The overall configuration with the embedded electrodes will also exhibit higher insertion losses than the embodiment shown in FIG. 1, for example, of my copending application which has no embedded electrodes. This will be discussed in more detail below in conjunction with FIG. 7.

While several production methods are possible to make a coaxial, unwound, cylindrical embedded electrode pattern, the preferred one is the utilization of the "dipping method" disclosed in U.S. Pat. No. 3,016,597. The inner portion of the ceramic tube 21 is built up by a series of dipping operations which results in a coating of ceramic slurry on a rod to a thickness equal to the distance between the inside of the ceramic tube and the inner surfaces of the capacitor plate-forming electrode portions 22a and 24a. The electrode portions 22a and 24a can be painted, printed, sprayed, etc., using noble metal coatings over the ceramic material to the ends of the tube at the proper time and the dippings continued until the desired ceramic spacing between the plate-forming electrode portions 22a and 24a and the outer electrode 26 to be formed is obtained. The resulting tube is then fired to sinter the ceramic mix. A monolithic ceramic tube structure results with the inner electrode portions 22a and 24a embedded within the tube and extending to the ends thereof as shown in FIG. 1.

The filter unit is completed by applying suitable conductive coatings (e.g., noble metals, etc., over the completed tube to form the outer electrode 26 and the side portions 22b and 24b of the electrodes 22 and 24 which latter side portions make physical and electrical contact with the capacitor plate-forming portions 22a and 24a which extend to the edges of the ceramic tube 20. The central conductor 12 carrying the inductor core 14 and the discs 16 and 18 are then applied and soldered in place to complete the filter unit. Thus, as shown in FIG. 1, connections to the double-capacitor can be easily and simply achieved thereby yielding a pi filter having embedded plate-forming electrodes.

In my previously mentioned copending application a configuration utilizing a magnetic tape wound ferromagnetic core with one single turn (the throughgoing terminal) was disclosed. (See FIG. 11 of the copending application). It is possible however, to employ more than one turn of the throughgoing wire in combination with such a tape wound core or any other ferromagnetic or ferrimagnetic core and the embedded electrode structure described above.

In FIG. 2 there is shown a pi filter unit having more than one turn. The filter unit 30 has a tape wound core 32 which has a number of turns of a fine throughgoing wire 34 around the outside diameter. The capacitor structure including the embedded plate-forming electrodes is similar to that described in FIG. 1 and therefore need not be discussed again in detail. The fine throughgoing wire 34 is brought out through the end washers 36 and 38 through a slot 40 and soldered to the terminal 42 at points 42a and 42b. (See FIG. 4). The end washers 36 and 38 may be made of brass or other suitable materials.

It is possible to wind the outside diameter of the magnetic core 32 helically with the fine wire 34 but the more effective and preferred configuration is shown in FIG. 3 for example, where the windings are parallel to the axis of the core 32. The tape wound core has windings 34' parallel to the axis of the core 32 to form a coil. The completed multiturn core 50 has outer insulating members 52a, 52b, 54a and 54b made of an insulating material such as Kapton plastic film manufactured by E. I. du Pont, Wilmington, Del. The ends of the winding wire 34' may be brought out through openings 56a and 56b and joined to the center terminal wires 58a and 58b. The type of core construction and core arrangement shown in FIG. 3 can be utilized with the embedded electrode structure for the capacitor sections as shown in FIG. 2.

The greater the number of turns used, the higher is the attenuation performance of the filter. However, the current carrying capacity of the filter decreases with the increasing number of turns in the core because the DC resistance of the coil increases and the current sensitivity of the attenuation increases due to the drop of permeability of the tape wound core caused by magnetic bias.

The combination of a core having a plurality of turns (as shown in FIGS. 2 and 3) and the embedded electrodes structure described above and shown in FIGS. 1 and 2 give a highly effective pi filter where the increased DC resistance and current sensitivity of the attenuation can be tolerated. As known in the art, the inductance of a toroid wound with $n$ turns grows with the square of $n$, up to frequencies at which no significant resonance effects occur. Accordingly, the insertion loss of a pi filter increases approximately with 40 log $n$ db. up to such frequencies.

When it is desirable to generate more capacitance than is practically possible using the structure described above for FIGS. 1 and 2, a multilayer tubular capacitor may be utilized. The known and presently available multilayer tubular capacitors consist of two terminal devices which cannot be conveniently used for pi filters.

One method which might be used would involve producing a multilayer capacitor in two halves and soldering them together into a three terminal double-capacitor. The common electrode connection being formed in the middle by a solder joint could provide a connection with the ground electrode.

FIG. 5 shows a double-multilayer tubular capacitor structure having two half-sections 60a and 60b joined by noble metal joint 62. This structure may be formed by coating one end of the multilayer capacitor sections 60a and 60b with silver layers, or other suitable conductive metal. The two sections 60a and 60b are placed in contact with each other so that the end surfaces previously coated with silver are in direct contact with each other. The two sections are then attached by using solder, conductive organic adhesive (such as e.g., an epoxy resin—silver powder mixture), conductive inorganic adhesive (such as e.g., a silver powder—glass powder mixture) or any other suitable means. Each of the multilayer capacitor sections contain embedded plate-forming electrodes 64 and embedded ground electrodes 66. The plate-forming electrodes 64 extend to the outer ends of the ceramic tubes of the capacitor sections 60a and 60b and are connected to each other by conductive metal layers 68a and 68b. The metal layers 68a and 68b are contiguous with and may be formed at the same time as inner metal electrodes 70a and 70b which are coated on the inner surface of the ceramic tube. The external ground electrode 72 is also a suitable conductive metal layer which is applied, however, on the outer surface of the ceramic tube and spaced from the plate connectors 68a and 68b for proper insulation. The metal layers 68a and 68b, 70a and 70b and 72 can be applied by painting, dipping, spraying, etc., with proper masking to allow suitable separation and insulation between the plate and ground electrodes. The external ground electrode 72 is physically and electrically connected to the joint 62 and the embedded ground electrodes 66 as shown in FIG. 5. The joint 62 acts as an electrode connector and makes contact with the embedded ground electrodes 66 which extend to the ends of the ceramic tubes which were attached at joint 62 but do not extend to the outer ends of the ceramic tubes and therefore have no contact with the metal layers 68a and 68b. The capacitor section comprises plate electrodes 64 and 70a and 70b connected by the conductive portions 68a and 68b and ground electrodes 66 and 72 connected by the conductive joint 62. As previously mentioned, this structure is then combined with a magnetic core (ferrimagnetic or ferromagnetic) to form a three terminal pi filter. This type of filter gives higher capacitance in both sections of the filter and therefore exhibits extremely high attenuation from the low frequencies and extending upwards.

While the method of joining two half-capacitors with embedded electrodes accomplish the goal of yielding a three terminal pi filter the device requires considerable handling during fabrication and therefore is an expensive method. Also, a device formed by joining two sections as described above is generally more fragile than a construction which could be made of one piece.

In order to reduce costs and to add some strength to the multilayer capacitor structure an alternate method consists of joining the two capacitor halves, prior to firing, by a noble metal joint 62 and the two halves are then cofired with the application of gentle pressure, if necessary, during the firing step.

Additional cost reduction and better strength can be further obtained if the noble metal electrode pattern is deposited in such a way that the connecting surface or joint is created during the formation of the electrodes. The strength can be greatly increased by creating the inside part of a tube 74 of solid ceramic as shown in FIG. 6. The interconnecting electrode 62a extends only 50 to 70 percent of the wall thickness of the ceramic tube 76 as measured from the outer surface where it finally joins the external ground electrode 72.

The construction of the embedded electrode structure shown in FIG. 6 will be described by utilization of a silk screening method. Other known methods, like dipping, painting, spraying, etc., may also be utilized with proper masking techniques as will be apparent to those skilled in the art. A long rod may be used to hold a plurality of green capacitors in one piece which are then fired in one piece and then severed at the planes A and B, for example, by a diamond saw or other suitable device to yield a number of solid capacitors.

Figure 6A:
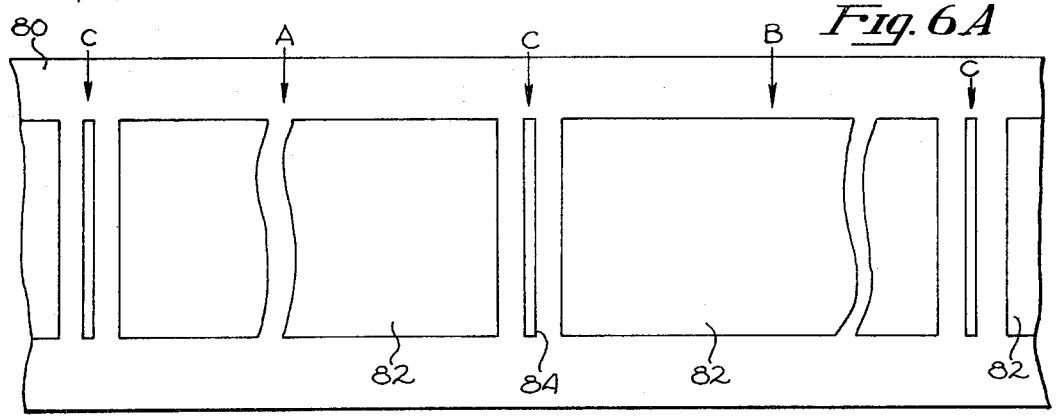
FIG. 6A shows a silk screen which may be utilized for obtaining a portion of the filter structure shown in FIG. 6.

A first noble metal electrode 66a is screened on the green ceramic tube 74 by standard techniques known in the art. The first electrode 66a is formed with interruptions approximately in the vicinity where the planes A and B lie. These interruptions will later serve as insulating widths X and Y for the embedded ground electrodes 66a when the rods are finally severed at A and B and the individual devices are fitted with connectors for the plate electrodes to be formed. A ceramic layer 76 is then screened on. The ceramic layer is not interrupted in the vicinity of planes A and B but has a narrow gap or interruption at plane C where after the screening of the ceramic layer 76, a portion of the previous noble metal layer (electrode) 66a remains uncovered. FIG. 6A shows a screen 80 which may be used for a second noble metal pattern 82, which will form the plate electrodes 64a for the capacitor. The pattern of the screen 80 is such that metal will be deposited in the areas of the planes A and B which will eventually constitute the end walls after the rods have been severed. The outer ends of electrodes 64a formed by the screen 80 will be picked up with the other plate-forming electrodes (e.g., 64b) by applying a conductive layer on the end walls at A and B as will be described. The screen 80 shown in FIG. 6A also has between electrode patterns 82, a narrow window or opening 84 which coincides approximately with plane C previously described. A noble metal paste is pressed through the narrow gap previously left in the vicinity of plane C in the ceramic layer 76 which was deposited before the second screen 80 was applied. This metal paste will make contact, through the ceramic layer 76, with ground electrode 66a first deposited. A ceramic layer 86 is then screened in a manner similar to that for layer 76. During the screening of the next ground potential electrode 66b, and the next plate electrode 64b, a noble metal paste will again fill the gap left in the ceramic layer 86 and subsequent ceramic layers. This process can be repeated as many times as is required to obtain the desired multilayer capacitor structure. Thus when the process is finished there is formed a solid interconnecting electrode 88 which together with the ceramic portion 74 in the inner part of the tube holds the capacitor structure firmly together, during and after firing. The inner plate electrodes 70a' and 70b' and the external ground electrode 72' are formed in a similar manner to that described for the comparable portions of the embodiment of FIG. 5. The conductive layers 68a' and 68b' (e.g., noble metal) deposited on the planes A and B form the connectors for the plate-forming electrodes including the inner plate electrodes 70a' and 70b'. The three terminal pi filter can then be formed as previously described above utilizing dust cores, ferrites, tape wound cores, etc., with one single throughgoing terminal similar to that shown in FIG. 1 or with a plurality of turns similar to that shown in FIG. 2, for example.

While the magnetic cores used in the invented pi filter structure may be either ferrites or ferromagnetic material it has been found that for low-pass pi filters blocking high-frequencies interference above approximately 1 megacycle up to approximately 30,000 megacycles or higher the ferromagnetic material gives better performance. It has been found that the ferromagnetic core or beads, used as the inductors in the filter structures discussed above, give excellent results when made of nickel-iron alloyed powder held together by a suitable nonmagnetic binder. One magnetic core comprised of nickel and iron powder in equal amounts, the powder having an average particle size of about 15 microns. The nonmagnetic binder can be a suitable epoxy resin. Other ferromagnetic materials from which the inductor cores can be made are iron and alloys of iron-cobalt, iron-nickel, iron-cobalt-nickel, iron-nickel-molybdenum, iron-aluminum, iron-silicon-aluminum, iron-nickel-chromium and iron-silicon, etc., with minor additions of other materials. The "Q" factor of ferromagnetic cores or beads may be for example $10^{-2}$ or less at frequencies above 100 megacycles per second. The cores may be powdered cores, tape wound or in laminated form as shown in FIGS. 10, 11 and 12, respectively, of my previously mentioned copending application.

Figure 7:
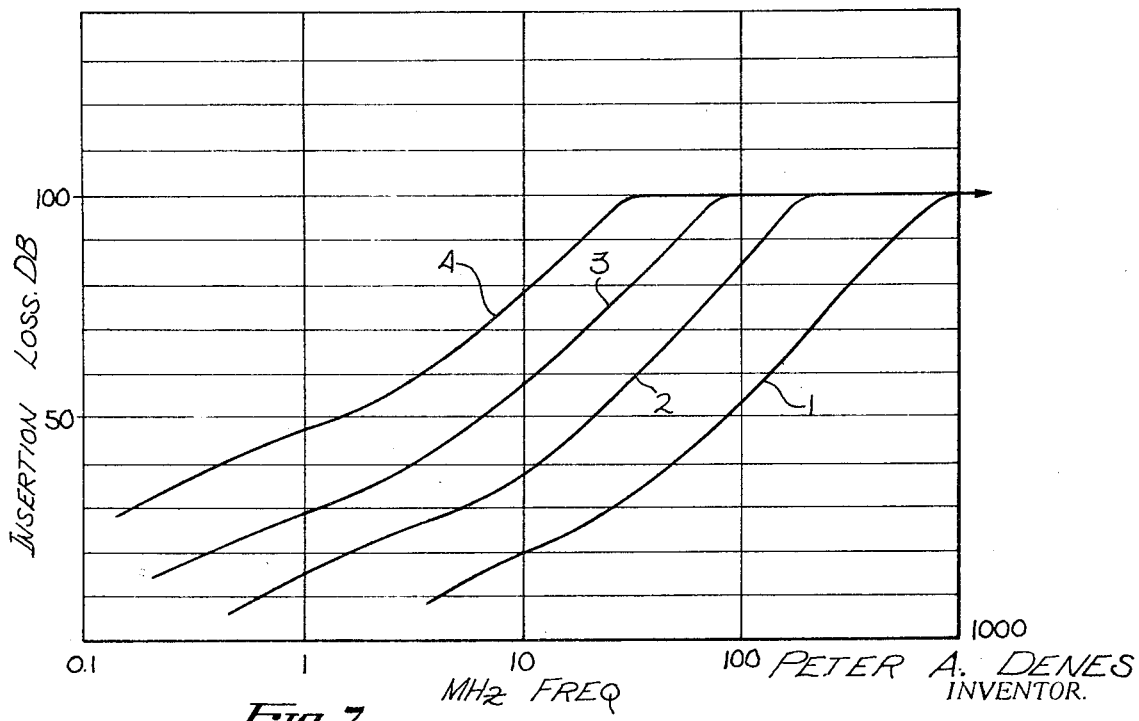
FIG. 7 shows a graph on which insertion loss vs. frequency has been plotted for a prior art type filter along with plots similar to the embodiments illustrated in FIGS. 1, 2 and 5.

FIG. 7 is a plot on a semilogarithmic scale of insertion loss vs. frequency for various structures of filters discussed herein. All the filters tested had the same geometrical size (2.5 millimeters diameter and 10 millimeters long) and employed the same ceramic and ferromagnetic compositions. The measurements were made in accordance with MIL-STD-220A.

Curve 1 shows the insertion loss of a filter having a solid ceramic tube and no embedded electrodes. The plate and ground electrodes were formed on the inner and outer surfaces of the ceramic insulator similar to configuration shown in FIG. 1 of my previously mentioned copending application.

Curve 2 shows the insertion loss performance of a filter of the same geometric size having a double capacitor with one embedded electrode such as that shown in FIG. 1 of this disclosure (FIG. 6 of my previously mentioned copending application). It should be noted that the insertion loss curve of the embedded structure (Curve 2) runs approximately 15 to 20 db. higher than that of the nonembedded filter. This means that the embedded structure attenuates the unwanted signal power 30 to 100 times more effectively than the nonembedded filters.

CUrve 3 is the insertion loss of a filter of the same size as in curves 1 and 2 but having five embedded electrode layers in each capacitor section. The higher capacitance yields higher insertion loss and thus even higher attenuation properties than the single embedded electrode of curve 2. (See FIGS. 5 and 6). Also, curve 3 closely approximates the insertion loss characteristics for a filter having one embedded electrode in each capacitor section and a multiturn inductor like that shown in FIG. 3.

Curves 1–3 utilized the same magnetic core with one turn, the throughgoing terminal. Curve 4 is the insertion loss of a filter of the same size and having the same capacitor structure and the same magnetic core as the filter plotted in curve 3, with the exception that the magnetic core had 10 turns of windings. (See FIGS. 2 and 3). This structure filter yields even higher insertion losses than any of the other configurations.

Naturally, certain properties are traded when changing from one structure to another. The full ceramic capacitor without embedded electrodes withstands a higher voltage than that with one or more embedded electrodes. Double-capacitors having five embedded electrodes are more expensive than those with only one embedded electrode. If turns are applied around the magnetic core, only smaller currents can be carried. Fortunately, today's miniaturized or integrated circuits work with relatively low voltages and currents and the multiturn configurations may present no problems.

Thus the present invention allows the use of various magnetic core configurations in combination with a single embedded capacitor electrode or multilayer embedded capacitor electrodes to yield stronger and better performing pi filters. If desired the space between the magnetic core and capacitor section may be epoxy filled or filled with other suitable material such as polyurethane or silicone rubber. This latter structure will result in stronger units able to withstand more extreme environmental conditions such as vibration, etc. The utilization of three terminal devices having embedded electrode structures have heretofore been unavailable and the unique and dramatic attenuation properties obtained by such structure have been unrealized. The structures and methods discussed are merely illustrative of preferred structures and methods and the invention is not intended to be so limited. Other suitable structures and methods coming within the scope of the invention will be apparent to those skilled in the art.

I claim:

1. A miniature pi low-pass filter having more than a 15 db. insertion loss at a frequency of 1 megahertz comprising:
   a. a central conductor;
   b. a ferromagnetic inductor in contact with and surrounding said central conductor;
   c. a solid body capacitor unit surrounding said inductor and being concentric therewith, said capacitor unit having a tube of ceramic material of a given thickness and the two capacitor sections therein, said capacitor sections having at least one common external electrode for both sections and at least one electrode embedded in each section within said ceramic tube, said embedded electrodes being insulated from each other and from said common electrode whereby the spacing of said embedded electrodes from said common electrode determine the capacitance and the thickness of said ceramic tube is determined primarily by strength considerations;
   d. said embedded electrodes being connected to separate points on said central conductor, said connection point being on opposite sides of said inductor and forming two terminals for connection; and
   e. said common electrode constituting a third terminal.

2. The pi filter as described in claim 1 in which said inductor is a metallic wound tape, the winding being insulated and bound together by an electrically insulating binder and said inductor having one turn.

3. The pi filter as described in claim 1 in which said ferromagnetic inductor comprises at least one of the group consisting of iron, nickel, cobalt and an alloy of at least one of the aforementioned metals.

4. The pi filter of claim 3 wherein said alloy is one of the group consisting of iron-nickel, iron-cobalt, iron-cobalt-nickel, iron-nickel-molybdenum, iron-nickel-chromium, iron-silicon, iron-aluminum and iron-silicon-aluminum.

5. A miniature pi low-pass filter having more than a 25 db. insertion loss at a frequency of 1 megahertz comprising:
   a. an inductor having a magnetic core and a plurality of turns of a throughgoing wire wound around said magnetic core to provide increased filter attenuation performance;
   b. a solid body capacitor unit surrounding said inductor and being concentric therewith, said capacitor unit having a tube of ceramic material of a given thickness and two capacitor sections having at least one common external electrode for both sections and at least one electrode embedded in each section within said ceramic tube, said embedded electrodes being insulated from each other and from said common electrode whereby the spacing of said embedded electrodes from said common electrode determine the capacitance and the thickness of said ceramic tube is determined primarily by strength considerations;
   c. the ends of said wire forming two terminals for connection; and
   d. said common electrode constituting a third terminal.

6. The pi filter described in claim 5 in which said inductor is a ferrimagnetic material having a plurality of turns of a throughgoing wire wound around said magnetic core.

7. The pi filter as described in claim 5 in which said inductor is a ferromagnetic material having a plurality of turns of a throughgoing wire wound around said magnetic core.

8. The pi filter as described in claim 7 in which said ferromagnetic inductor comprises at least one of the group consisting of iron, nickel, cobalt and an alloy of at least one of the aforementioned metals.

9. The pi filter of claim 8 wherein said alloy is one of the group consisting of iron-nickel, iron-cobalt, iron-cobalt-nickel, iron-nickel-molybdenum, iron-nickel-chromium, iron-silicon, iron-aluminum and iron-silicon-aluminum.

10. The pi filter as described in claim 1 in which said inductor is a tape wound core and the windings of the throughgoing wire are parallel to the axis of the core.

11. A miniature pi low-pass filter having more than a 25 db. insertion loss at a frequency of 1 megahertz comprising:
    a. a central conductor;
    b. a magnetic core inductor in contact with and surrounding said central conductor;
    c. a solid body capacitor unit surrounding said inductor and being concentric therewith said capacitor unit having a tube of insulating material of a given thickness and two capacitor sections therein; said capacitor sections each containing a plurality of embedded electrode layers, alternate ones of said embedded electrode layers from each capacitor section being connected together by a conductive inner joint to form a system of connected common electrodes, the remaining embedded electrodes of each section being extended to the outer ends of the insulating tube and connected at their outer ends by a side conductive layer to form a system of two separate parallelly connected electrodes which are connected to the central conductor at separate points and on opposing sides of said inductor to form two terminals; and
    d. said system of common electrodes being connected at the outer surface of said insulating material to form a third terminal.

12. The pi filter described in claim 11 in which said insulating material is a ceramic.

13. The pi filter as described in claim 12 in which said inductor is a ferrimagnetic material having one turn.

14. The pi filter described in claim 12 in which said two capacitor sections are formed by joining two individual multilayer capacitor sections by soldering so that a common conductive inner joint is formed for connecting the common electrodes of both sections and the remaining electrodes in each section are separately connected at each of the outer edges thereof by a conductive layer.

15. The pi filter described in claim 12 in which said two capacitor sections are formed on a single solid ceramic tube and the plurality of electrodes and subsequent insulating layers between said electrodes are formed on said single ceramic tube, said common electrodes being connected by a conductive layer deposited during the formation of said electrodes and during the formation of subsequent insulating layers by screening or masking.

16. The pi filter as described in claim 12 in which said inductor is a ferromagnetic material having one turn.

17. The pi filter as described in claim 11 in which two inner electrodes are positioned on the internal surface of said insulating material so that they are insulated from each other and each inner electrode is connected to a side conductive layer and the embedded electrodes which extend to the outer ends of the insulating tube.

18. The pi filter as described in claim 11 in which an external electrode is positioned on the outer surface of said insulating tube which external electrode is joined to the common conductive inner connection and to the commonly connected electrodes of both capacitor sections.

19. The pi filter as described in claim 18 in which said ferromagnetic inductor comprises at least one of the group consisting of iron, nickel, cobalt and an alloy of at least one of the aforementioned metals.

20. The pi filter of claim 19 wherein said alloy is one of the group consisting of iron-nickel, iron-cobalt, iron-cobalt-nickel, iron-nickel-molybdenum, iron-nickel-chromium, iron-silicon, iron-aluminum and iron-silicon-aluminum.

21. The pi filter as described in claim 18 in which said inductor is a metallic wound tape, the winding being insulated and bound together by an electrically insulated binder and said inductor having one turn.

22. A miniature pi low-pass filter having more than a 45 db. insertion loss at a frequency of 1 megahertz comprising:
   a. an inductor having a magnetic core and a plurality of turns of a throughgoing wire wound around said magnetic core to provide increased filter attenuation performance;
   b. a solid body capacitor unit surrounding said inductor and being concentric therewith, said capacitor unit having a tube of insulating material of a given thickness and two capacitor sections therein; said capacitor sections each containing a plurality of embedded electrode layers, alternate ones of said embedded electrode layers from each capacitor section being connected together by a conductive inner joint to form a system of connected common electrodes, the remaining embedded electrodes of each section being extended to the outer ends of the insulating tube and connected at their outer ends by a side conductive layer to form a system of two separate parallelly connected electrodes which are connected to the ends of said throughgoing wire to form two terminals; and
   c. said system of common electrodes being connected at the outer surface of said insulating material to form a third terminal.

23. The pi filter described in claim 22 in which said insulating material is a ceramic.

24. The pi filter described in claim 23 in which said inductor is a ferrimagnetic material having a plurality of turns of a throughgoing wire wound around said magnetic core.

25. The pi filter as described in claim 23 in which said inductor is a ferromagnetic material having a plurality of turns of a throughgoing wire wound around said magnetic core.

26. The pi filter as described in claim 25 in which said inductor is a tape wound core and the windings of the throughgoing wire are parallel to the axis of the core.

27. The pi filter as described in claim 25 in which said ferromagnetic inductor comprises at least one of the group consisting of iron, nickel, cobalt and an alloy of at least one of the aforementioned metals.

28. The pi filter as described in claim 27 wherein said alloy is one of the group consisting of iron-nickel, iron-cobalt, iron-cobalt-nickel, iron-nickel-molybdenum, iron-nickel-chromium, iron-silicon, iron-aluminum and iron-silicon-aluminum.

29. A miniature pi low-pass filter having more than a 15 db. insertion loss at a frequency of 1 megahertz comprising:
   a. a central conductor;
   b. a magnetic core inductor in contact with and surrounding said central conductor;
   c. a solid body capacitor unit surrounding said inductor and being concentric therewith, said capacitor unit having a tube of ceramic material of a given thickness and two capacitor sections therein, said capacitor sections having at least one common external electrode for both sections and at least one electrode embedded in each section within said ceramic tube, said embedded electrodes being insulated from each other and from said common electrode whereby the spacing of said embedded electrodes from said common electrode determine the capacitance and the thickness of said ceramic tube is determined primarily by strength considerations;
   d. said embedded electrodes being connected to separate points on said central conductor, said connection point being on opposite sides of said inductor and forming two terminals for connection; and
   e. said common electrode constituting a third terminal.

30. The pi filter as described in claim 29 in which said inductor is a ferrimagnetic material having one turn.

31. The pi filter as described in claim 29 in which said inductor is a ferromagnetic material having one turn.

32. The pi filter as described in claim 31 in which said inductor is a metallic wound tape, the winding being insulated and bound together by an electrically insulated binder and said inductor having one turn.

33. The pi filter as described in claim 31 in which said ferromagnetic inductor comprises at least one of the group consisting of iron, nickel, cobalt and an alloy of at least one of the aforementioned metals.

34. The pi filter of claim 33 wherein said alloy is one of the group consisting of iron-nickel, iron-cobalt, iron-cobalt-nickel, iron-nickel-molybdenum, iron-nickel-chromium, iron-silicon, iron-aluminum and iron-silicon-aluminum.

* * * * *